(12) United States Patent
Ljung

(10) Patent No.: US 11,418,296 B2
(45) Date of Patent: Aug. 16, 2022

(54) COVERAGE ENHANCEMENT AND FAST ACKNOWLEDGEMENT

(71) Applicant: Sony Mobile Communications Inc., Tokyo (JP)

(72) Inventor: Rickard Ljung, Helsingborg (SE)

(73) Assignee: SONY GROUP CORPORATION, Tokyo (JP)

( * ) Notice: Subject to any disclaimer, the term of this patent is extended or adjusted under 35 U.S.C. 154(b) by 174 days.

(21) Appl. No.: 16/479,653

(22) PCT Filed: Jan. 16, 2018

(86) PCT No.: PCT/EP2018/050946
§ 371 (c)(1),
(2) Date: Jul. 22, 2019

(87) PCT Pub. No.: WO2018/134183
PCT Pub. Date: Jul. 26, 2018

(65) Prior Publication Data
US 2021/0250129 A1    Aug. 12, 2021

(30) Foreign Application Priority Data
Jan. 23, 2017 (EP) .................... 17152676

(51) Int. Cl.
*H04L 1/18* (2006.01)
*H04W 16/14* (2009.01)

(52) U.S. Cl.
CPC ............ *H04L 1/189* (2013.01); *H04L 1/1845* (2013.01); *H04L 1/1864* (2013.01); *H04L 1/1896* (2013.01); *H04W 16/14* (2013.01)

(58) Field of Classification Search
CPC ..... H04L 1/189; H04L 1/1845; H04L 1/1896; H04L 1/1864
See application file for complete search history.

(56) References Cited

U.S. PATENT DOCUMENTS 6,615,382 B1    9/2003  Kang et al.
6,661,849 B1   12/2003  Guo et al.
(Continued)

FOREIGN PATENT DOCUMENTS

CN    103378936 A    10/2013
CN    104521307 A     4/2015
WO    2015060564 A1   4/2015

OTHER PUBLICATIONS

International Search Report and Written Opinion from corresponding International Patent Application No. PCT/EP2018/050946, dated Mar. 29, 2018, 10 pages.
International Preliminary Report on Patentability dated Jul. 23, 2019 for Application Serial No. PCT/EP2018/050946 (7 pages).
(Continued)

*Primary Examiner* — Min Jung
(74) *Attorney, Agent, or Firm* — Tucker Ellis LLP

(57) ABSTRACT

A method includes receiving a first signal (5012). The first signal is received from a remote node. The first signal includes a first plurality of repetitions of encoded data. The method further includes transmitting an acknowledgement signal (5014) to the remote node. The acknowledgement signal is transmitted in response to said receiving of the first signal. The method further includes receiving a second signal (5015). The second signal includes a second plurality of repetitions of the encoded data and is also received from the remote node. The second signal is received after transmitting the acknowledgement signal. The method further includes combining the first plurality of repetitions of the encoded data and the second plurality of repetitions of the encoded data to yield a combined signal. The method further includes decoding (5016) the encoded data based on the combined signal.

20 Claims, 9 Drawing Sheets

(56) References Cited

U.S. PATENT DOCUMENTS

| | | | |
|---|---|---|---|
| 10,079,659 B2* | 9/2018 | Lin | H04L 1/1864 |
| 10,542,456 B2 | 1/2020 | Karlsson et al. | |
| 11,005,616 B2 | 5/2021 | Ljung | |
| 2007/0002818 A1* | 1/2007 | Steer | H04L 1/1845 |
| | | | 370/344 |
| 2008/0242236 A1 | 10/2008 | Spencer | |
| 2011/0305193 A1 | 12/2011 | Grant | |
| 2012/0147830 A1 | 6/2012 | Lohr et al. | |
| 2013/0051272 A1 | 2/2013 | Wiberg | |
| 2013/0343273 A1 | 12/2013 | Barbieri et al. | |
| 2014/0280712 A1 | 9/2014 | Dolezilek et al. | |
| 2015/0098418 A1 | 4/2015 | Vajapeyam et al. | |
| 2015/0280876 A1 | 10/2015 | You et al. | |
| 2015/0341956 A1* | 11/2015 | Sun | H04L 5/0001 |
| | | | 370/329 |
| 2016/0135170 A1 | 5/2016 | Chen et al. | |
| 2016/0174259 A1 | 6/2016 | Mukherjee | |
| 2016/0211949 A1 | 7/2016 | You et al. | |
| 2016/0226643 A1 | 8/2016 | Mallik et al. | |
| 2017/0230951 A1 | 8/2017 | Xiong et al. | |
| 2017/0257190 A1* | 9/2017 | Wang | H04L 1/1816 |
| 2018/0123765 A1* | 5/2018 | Cao | H04L 1/1861 |
| 2019/0273574 A1* | 9/2019 | Goektepe | H03M 13/1102 |
| 2020/0028630 A1* | 1/2020 | Beale | H04L 1/188 |
| 2020/0044789 A1* | 2/2020 | Beale | H04L 1/1858 |
| 2020/0083991 A1* | 3/2020 | Nader | H04L 1/1864 |
| 2020/0235859 A1* | 7/2020 | Ljung | H04L 1/08 |

OTHER PUBLICATIONS

European Office Action dated Aug. 4, 2021 for Application Serial No. 18700362.9 (6 pages).
International Search Report and Written Opinion dated Sep. 7, 2016 for Application Serial No. PCT/EP2015/081053 (10 pages).
3GPP Technical Specification 36 321 V 12.7 0, "Evolved Universal Terrestrial Radio Access (E-UTRA); Medium Access Control (MAC) protocol specification," dated Sep. 2015 (77 pages).
3GPP Technical Report 45 820 V13.0.0, "Cellular System Support for Ultra-Low Complexity and Low Throughput ntemet of Thins (CioT)," dated Aug. 2015 (495 pages).
International Search Report and Written Opinion dated Sep. 7, 2016 for Application Serial No. PCT/EP2015/080965 (3 pages).
Chinese Search Report dated Jun. 20, 2020 for Application Serial No. CN2015800858157 (Published as CN 108702250) (2 pages).
Chinese Search Report dated Jun. 20, 2020 for Application Serial No. CN201580085802 (Published as C108702249) (2 pages).
Chinese Office Action dated Jul. 1, 2020 for Application Serial No. CN2015800858157 (5 pages).
European Office Action dated Jul. 3, 2020 for Application Serial No. EP15813878.4 (Published as EP3394997) (2 pages).
European Office Action dated Nov. 30, 2020 for Application Serial No. EP15813878.4 (Published as EP3394997) (2 pages).
European Office Action dated Jul. 3, 2020 for Application Serial No. EP15817846.7 (Published as EP3394998) (2 pages).
European Office Action dated Dec. 2, 2021 for Application Serial No. EP15817846.7 (Published as EP3394998) (2 pages).

\* cited by examiner

COVERAGE ENHANCEMENT AND FAST ACKNOWLEDGEMENT

TECHNICAL FIELD

Various embodiments of the invention generally relate to techniques of communicating encoded data. Various embodiments of the invention specifically relate to communicating multiple repetitions of the encoded data and communicating an acknowledgement signal.

BACKGROUND

Mobile communication by means of cellular networks is an integral part of modern life. Examples of cellular networks include the Third Generation Partnership Project (3GPP) Long Term Evolution (LTE; sometimes also referred to as 4G) and 3GPP New Radio (NR; sometimes also referred to as 5G) technology. Here, multiple nodes are connected to form the network. The network may comprise a plurality of cells.

Such communication systems can be combined with communication on an open spectrum including unlicensed bands. For example, see 3GPP RP-162159 (3GPP TSG RAN Meeting #74, Vienna, Austria, Dec. 5-8, 2016) and RP-162043 (3GPP TSG RAN Meeting #74, Vienna, Austria, Dec. 5-8, 2016).

A particular use case for communication on unlicensed bands relates to Internet of Things (IoT) solutions. For communication on unlicensed bands, the transmission resources are shared among multiple networks, operators, or, generally, any node that wants to access the unlicensed band. Typically, this involves listen before talk (LBT) techniques to ensure that resources for transmission are available on the unlicensed band. Alternatively or additionally to LBT techniques, back-off techniques can be applied. According to back-off techniques, a transmission attempt resulting in a collision with one or more further nodes attempting to transmit on the unlicensed band can result in a further retransmission attempt, e.g., after a random timeout time duration.

A set of features where a comparably large coverage is achieved is referred to as Coverage Enhancement (CE). CE technology is envisioned to be applied for Machine Type Communication (MTC) and the Narrowband IoT (NB-IOT), sometimes also referred to as NB-LTE. For example, such techniques may be based on the 3GPP LTE technology to some extent and may reuse some of the LTE concepts.

A key feature of the CE is to implement multiple transmission repetitions of encoded data. Here, each repetition may include the same redundancy version of the encoded data. The repetitions may be "blind", i.e., may not in response to a respective retransmission request that may be defined with respect to a Hybrid Acknowledgement Repeat Request protocol (HARQ protocol). Rather, repetitions according to CE may be preemptive. Examples are provided by the 3GPP Technical Report (TR) 45.820 version 13.0.0 (2015-August), section 6.2.1.3. By employing CE, a likelihood of successful transmission can be increased even in scenarios of poor conditions of communicating on a corresponding wireless link. Thereby, the coverage of networks can be significantly enhanced—even for no transmission powers as envisioned for the MTC and MB-IOT domain.

However, techniques of CE may face certain restrictions and drawbacks in combination with transmission on an unlicensed band. In particular, the count of repetitions according to the CE may be larger than 10, sometimes larger than 100, sometimes even larger than 2000. Then, a combination of CE implementing large counts of repetitions and a highly utilized unlicensed band can result in a significantly increased likelihood of collisions. This may be due to the increased transmission time required for the large count of repetitions according to the CE. Transmission collisions result typically in back-off and, consequently, further retransmissions. This can increase the latency and may result in increased energy consumption for the transmitting node.

SUMMARY

Therefore, a need exists for advanced techniques of transmission of data. In particular, a need exists for advanced techniques of transmission of data employing CE.

This need is met by the features of the independent claims. The features of the dependent claims define embodiments.

A method includes receiving a first signal. The first signal is received from a remote node. The first signal includes a first plurality of repetitions of encoded data. The method further includes transmitting an acknowledgement signal to the remote node. The acknowledgement signal is transmitted in response to said receiving of the first signal. The method further includes receiving a second signal. The second signal includes a second plurality of repetitions of the encoded data and is also received from the remote node. The method further includes combining the first plurality of repetitions of the encoded data and the second plurality of repetitions of the encoded data to yield a combined signal. The method further includes decoding the encoded data based on the combined signal.

For example, the second signal may be received after transmitting the acknowledgement signal.

A computer program product includes program code that may be executed by at least one processor. Executing the program code causes the at least one processor to perform a method. The method includes receiving a first signal. The first signal is received from a remote node. The first signal includes a first plurality of repetitions of encoded data. The method further includes transmitting an acknowledgement signal to the remote node. The acknowledgement signal is transmitted in response to said receiving of the first signal. The method further includes receiving a second signal. The second signal includes a second plurality of repetitions of the encoded data and is also received from the remote node. The method further includes combining the first plurality of repetitions of the encoded data and the second plurality of repetitions of the encoded data to yield a combined signal. The method further includes decoding the encoded data based on the combined signal.

A computer program includes program code that may be executed by at least one processor. Executing the program code causes the at least one processor to perform a method. The method includes receiving a first signal. The first signal is received from a remote node. The first signal includes a first plurality of repetitions of encoded data. The method further includes transmitting an acknowledgement signal to the remote node. The acknowledgement signal is transmitted in response to said receiving of the first signal. The method further includes receiving a second signal. The second signal includes a second plurality of repetitions of the encoded data and is also received from the remote node. The method further includes combining the first plurality of repetitions of the encoded data and the second plurality of repetitions of the encoded data to yield a combined signal. The method further includes decoding the encoded data based on the combined signal.

A network node includes control circuitry. The control circuitry is configured to perform a method. The method includes: receiving, from a remote node, a first signal including a first plurality of repetitions of encoded data; in response to said receiving of the first signal: transmitting an acknowledgement signal to the remote node; receiving, from the remote node, a second signal including a second plurality of repetitions of the encoded data; combining the first plurality of repetitions of the encoded data and the second plurality of repetitions of the encoded data to yield a combined signal; and decoding the encoded data based on the combined signal.

The control circuitry may be further configured to perform: performing a symbol comparison between at least one repetition of at least one reference symbol of the first signal with at least one predefined symbol, wherein the acknowledgement signal is selectively transmitted depending on the symbol comparison.

In an example, the at least one repetition of the at least one reference symbol is arranged adjacent to or interleaved with the first plurality of repetitions of the encoded data within the first signal.

In an example, the count of repetitions of the at least one reference symbol is smaller than the count of the first plurality of repetitions of the encoded data.

The control circuitry may be further configured to perform: performing a threshold comparison between a value indicative of a receive signal level of the first signal and a predefined threshold, wherein the acknowledgement signal is selectively transmitted depending on the threshold comparison.

The control circuitry may be further configured to perform: decoding the first plurality of repetitions of the encoded data after transmitting the acknowledgement signal.

In an example, the acknowledgement signal comprises at least one repetition of at least one acknowledgement reference symbol.

In an example, the acknowledgement signal is native to the physical Layer 1 of a transmission protocol stack and/or comprises one or more reference symbols.

The control circuitry may be further configured to perform: in response to said decoding of the data: transmitting an acknowledgement message to the remote node, the acknowledgement message being indicative of a decoding result of said decoding.

In an example, the first signal and the second signal are received on an open spectrum shared between multiple networks.

A method includes transmitting a first signal. The first signal includes a first plurality of repetitions of encoded data. The first signal is transmitted to a remote node. The method further includes receiving an acknowledgement signal from the remote node. The method further includes transmitting a second signal. The second signal includes a second plurality of repetitions of the encoded data. The second signal is transmitted to the remote node. The second signal is transmitted in response to said receiving of the acknowledgement signal.

A computer program product includes program code that may be executed by at least one processor. Executing the program code by the at least one processor causes the at least one processor to perform a method. The method includes transmitting a first signal. The first signal includes a first plurality of repetitions of encoded data. The first signal is transmitted to a remote node. The method further includes receiving an acknowledgement signal from the remote node. The method further includes transmitting a second signal. The second signal includes a second plurality of repetitions of the encoded data. The second signal is transmitted to the remote node. The second signal is transmitted in response to said receiving of the acknowledgement signal.

A computer program includes program code that may be executed by at least one processor. Executing the program code causes the at least one processor to perform a method. The method includes transmitting a first signal. The first signal includes a first plurality of repetitions of encoded data. The first signal is transmitted to a remote node. The method further includes receiving an acknowledgement signal from the remote node. The method further includes transmitting a second signal. The second signal includes a second plurality of repetitions of the encoded data. The second signal is transmitted to the remote node. The second signal is transmitted in response to said receiving of the acknowledgement signal.

A network node includes control circuitry configured to perform a method. The method includes: transmitting, to remote node, the first signal including a first plurality of repetitions of encoded data; receiving an acknowledgement signal from the remote node; and in response to said receiving of the acknowledgement signal: transmitting, to the remote node, a second signal including a second plurality of repetitions of the encoded data.

In an example, the first signal comprises at least one repetition of at least one reference signal.

In an example, the at least one repetition of the at least one reference symbol is arranged adjacent to or interleaved with the first plurality of repetitions of the encoded data within the first signal.

In an example, the acknowledgement signal comprises at least one repetition of a pilot signal.

The control circuitry may be further configured to perform after transmitting the second signal: receiving an acknowledgement message, the acknowledgement message being indicative of a decoding result of said decoding.

In an example, the first signal and the second signal are received on an open spectrum shared between multiple networks.

A system includes a first network node and a second network node. The first network node includes first control circuitry. The second network node includes second control circuitry. The first control circuitry is configured to transmit, to the second node, a first signal including a first plurality of repetitions of encoded data. The second circuitry is configured to receive the first signal. The second circuitry is configured to transmit an acknowledgement signal to the first node in response to receiving the first signal. The first control circuitry is configured to receive the acknowledgement signal. The first control circuitry is configured to transmit, to the second node, a second signal in response to said receiving of the acknowledgement signal. The second signal includes a second plurality of repetitions of the encoded data. The second control circuitry is configured to receive the second signal. The second control circuitry is further configured to combine the first plurality of repetitions of the encoded data and the second plurality of repetitions of the encoded data to yield a combined signal. The second control circuitry is further configured to decode the encoded data based on the combined signal.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
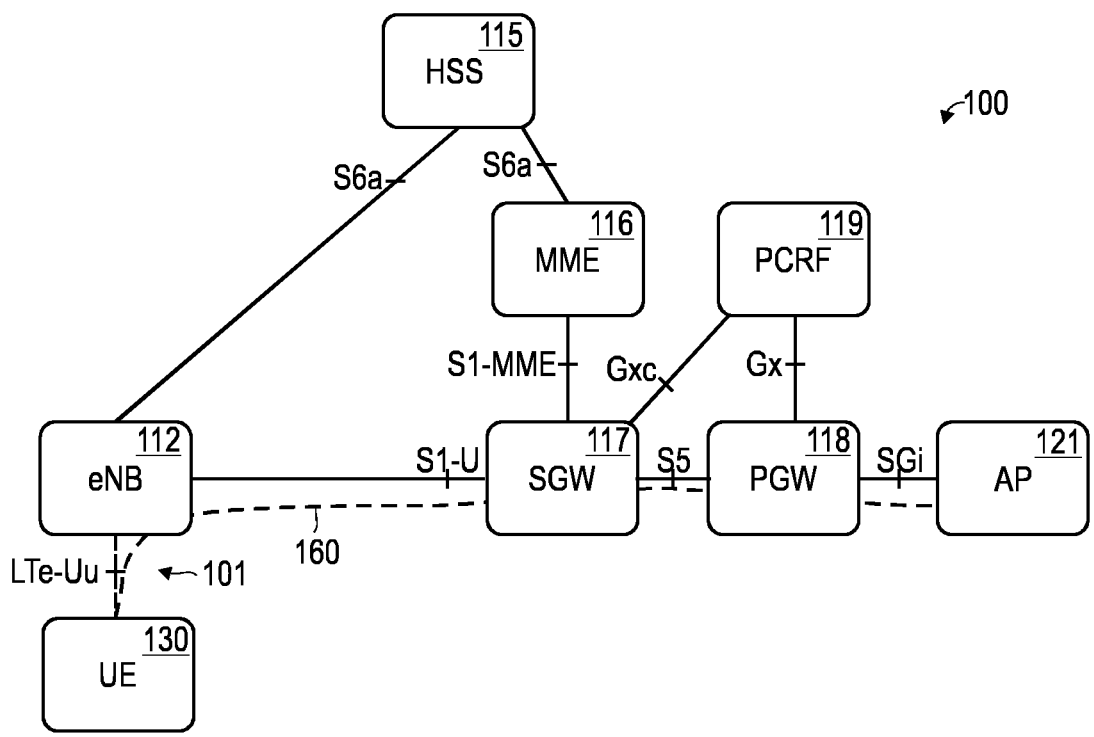
FIG. 1 schematically illustrates a cellular network including a wireless link according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of transmitting and/or receiving (communicating) encoded data between a first node in the second node of a network are disclosed.

For example, the data may correspond to payload data of applications implemented by the first node and/or the second node. Alternatively or additionally, the data may correspond to control data, e.g., Layer 2 or Layer 3 control data according to the Open Systems Interface (OSI) model.

According to various examples, the data may be uplink (UL) data or downlink (DL) data. For example, the data may be UL data transmitted from a mobile device (user equipment; UE) implementing the first node to a base station (BS) implementing the second node of a network. It would also be possible that the data is DL data transmitted from the base station to the UE. In other examples, device-to-device (D2D) communication on a sidelink of the wireless link of the network between two UEs could be employed.

According to examples, the encoded data is redundantly communicated using a plurality of repetitions. Hence, the same encoded version of the data may be redundantly communicated a number of times according to various examples. Each repetition of the plurality of repetitions can include the data encoded according to the same redundancy version, e.g., redundancy version 0 or redundancy version 1, etc. Then, it is possible to combine the plurality of repetitions of the encoded data. Such combination may be implemented in in analog domain, e.g., in the baseband. The combination yields a combined signal. Then, the decoding of the encoded data can be based on the combined signal. Thus, by aggregating the received information across the multiple repetitions, the probability of successfully decoding of the encoded data increases. This facilitates CE. Such techniques of CE may find particular application in the framework of the IoT technology, e.g., according to 3GPP MTC or NB-IOT. Here, typically, the transmitting UE implements a comparably low transmit power. Due to the multiple repetitions of the encoded data, nonetheless, a sufficiently high likelihood of successfully receiving and decoding the encoded data is provided for.

According to various examples, a first plurality of repetitions of encoded data and a second plurality of repetitions of the encoded data are subsequently communicated, e.g., offset by a time gap. Again, all repetitions of the first plurality of repetitions, as well as all repetitions of the second plurality of repetitions may include the data encoded according to the same redundancy version such that combination of the first plurality of repetitions and the second plurality of repetitions of the encoded data to yield the combined signal is facilitated. In-between communication of the first plurality of repetitions and the second plurality of repetitions, an acknowledgement signal can be communicated in a direction opposing the direction of communication of the encoded data. For sake of simplicity, this acknowledgement signal is, hereinafter, referred to as fast acknowledgement (FastACK).

By means of the FastACK, the following effect can be achieved. Prior to completing the full set of retransmissions of the encoded data—i.e., prior to completing transmission of, both, the first plurality of repetitions of the encoded data, as well as the second plurality of the encoded data—the likelihood of successful completion of the transmission of the data, e.g., including the likelihood of successfully decoding the encoded data, can be implicitly or explicitly indicated by means of the FastACK. Such indication is even possible prior to commencing decoding of the encoded data, e.g., based on secondary indicators such as a receive signal level of the corresponding signals including the multiple repetitions of the encoded data and/or a comparison between one or more reference symbols included in the corresponding signals and predefined symbols at the receiver. Thereby, in other words, it is possible to predict the likelihood with which the transmission of the encoded data will be successfully completed, i.e., the likelihood with which decoding yields the uncorrupted data. For example, if the likelihood with which the transmission of the encoded data will be successfully completed is comparably low, the transmitting node may decide to abort transmission of the repetitions of the encoded data, i.e., abort transmitting the second plurality of repetitions of the encoded data. Rather, the transmitting node may decide to implement a back-off.

The various techniques described herein may find particular application for transmission on unlicensed bands. An unlicensed band may reside in an open spectrum. Multiple operators or networks may share access to the open spectrum. In other words, access to the open spectrum may not be restricted to a single operator or network. Typically, the communication on the open spectrum may involve LBT procedures and/or back-off procedures. Such techniques are sometimes also referred to as Carrier Sense Multiple Access/Collision Avoidance (CSMA/CA). In particular, in the context of the open spectrum, the FastACK may be helpful to implement early identification of collision between multiple nodes attempting to access the spectrum. In particular, such collision may be detected prior to completion of the full set of retransmissions of the encoded data, i.e., prior to completing, both, transmission of the first plurality of repetitions of the encoded data, as well as the second plurality of repetitions of the encoded data. Then, a back-off can commence comparably early. This reduces the overall latency required for transmission of the encoded data, as well as the energy consumption of the transmitting node.

FIG. 1 illustrates the architecture of a cellular network 100 according to some examples implementations. In particular, the cellular network 100 according to the example of FIG. 1 implements the 3GPP LTE architecture, sometimes referred to as evolved packet system (EPS). This, however, is for exemplary purposes only. In particular, various scenarios will be explained in the context of a wireless link 101 between a UE 130 and the cellular network 100 operating according to the 3GPP LTE radio access technology (RAT) for illustrative purposes only. Similar techniques can be readily applied to various kinds of 3GPP-specified RATs, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks.

A further particular example is the 3GPP NB-IoT RAT. The 3GPP NB-IoT RAT may be based on the 3GPP LTE RAT, i.e., the Evolved UMTS Terrestrial Radio Access (E-UTRA). Further, the NB-IoT RAT may be combined with the EPS as illustrated in FIG. 1. The various examples disclosed herein may be readily implemented for the 3GPP NB-IoT RAT, alternatively or additionally.

Other examples include other types of networks, e.g., Institute of Electrical and Electronics Engineers (IEEE) 802.11X Wireless Local Area Network, Bluetooth or Zigbee.

The 3GPP LTE RAT implements a HARQ protocol. The HARQ protects data communicated via the wireless link 101. FEC and retransmission are employed in this respect.

The UE 130 is connected via the wireless link 101 to a BS 112 of the cellular network 100. The BS 112 and the UE 130 implement the evolved UMTS terrestrial radio access technology (E-UTRAN); therefore, the BS 112 is labeled evolved node B (eNB) in FIG. 1.

For example, the UE 130 may be selected from the group including: a smartphone; a cellular phone; a table; a notebook; a computer; a smart TV; a MTC device, an IoT device; etc.

An MTC or IoT device is typically a device with a low to moderate requirement on data traffic volumes and loose latency requirements. Additionally, communication employing MTC or IoT devices should achieve low complexity and low costs. Further, energy consumption of an MTC or an IoT device should be comparably low in order to allow battery-powered devices to function for a comparably long duration: The battery life should be sufficiently long. For example, the IoT device may be connected to the EPS via the NB-IoT RAT.

Communication on the wireless link 101 can be in UL and/or DL direction. Details of the wireless link 101 are illustrated in FIG. 2.

Figure 2:
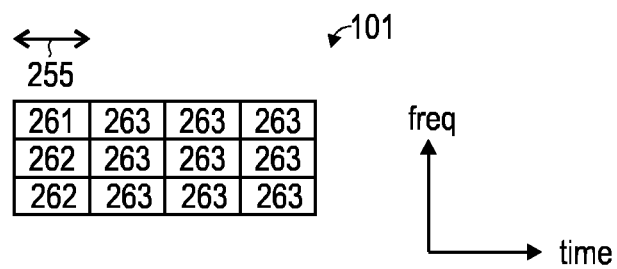
FIG. 2 schematically illustrates resources on the wireless link of the cellular network according to various examples.

FIG. 2 illustrates aspects with respect to channels implemented on the wireless link. The wireless link 101 implements a plurality of communication channels 261-263. Transmission frames 255—e.g., implemented by sub-frames—of the channels 261-263 occupy a certain time duration. Each channel 261-263 includes a plurality of resources which are defined in time domain and frequency domain. For example, the resources may be defined with respect to symbols encoded and modulated according to Orthogonal Frequency Division Multiplexing (OFDM).

For example, a first channel 261 may carry synchronization signals which enable the BS 112 and the UE 130 to synchronize communication on the wireless link 101 in time domain.

A second channel 262 may be associated with control messages (control channel 262). The control messages may configure operation of the UE 130, the BS 112, and/or the wireless link 101. For example, radio resource control (RRC) messages and/or HARQ ACKs and NACKs can be exchanged via the control channel. According to the E-UTRAN RAT, the control channel 262 may thus correspond to a Physical DL Control Channel (PDCCH) and/or a Physical UL Control Channel (PUCCH) and/or a Physical Hybrid ARQ indicator Channel (PHICH).

Further, a third channel 263 is associated with a payload messages carrying higher-layer user-plane data packets associated with a given service implemented by the UE 130 and the BS 112 (payload channel 263). According to the E-UTRAN RAT, the payload channel 263 may be a Physical DL Shared Channel (PDSCH) or a Physical UL Shared Channel (PUSCH).

In some examples, it is possible that at least some of the resources reside—at least partly or fully—in an open spectrum. Then, it is possible that the UE 130 and/or the BS 112 performs a LBT procedure and/or a back-off procedure when transmitting data on the respective channels 261-263.

Turning again to FIG. 1, the BS 112 is connected with a gateway node implemented by a serving Gateway (SGW) 117. The SGW 117 may route and forward payload data and may act as a mobility anchor during handovers of the UE 130.

The SGW 117 is connected with a gateway node implemented by a packet data network Gateway (PGW) 118. The PGW 118 serves as a point of exit and point of entry of the cellular network 110 for data towards a packet data network (PDN; not shown in FIG. 1): for this purpose, the PGW 118 is connected with an access point node 121 of the packet data network. The access point node 121 is uniquely identified by an access point name (APN). The APN is used by the UE 130 to seek access to the packet data network.

The PGW 118 can be an endpoint of an end-to-end connection 160 for packetized payload data of the UE 130. The end-to-end connection 160 may be used for communicating data of a particular service. Different services may use different end-to-end connections 160 or may share, at least partly, a certain end-to-end connection.

The end-to-end connection 160 may be implemented by one or more bearers which are used to communicate service-specific data. An EPS bearer which is characterized by a certain set of quality of service parameters indicated by the QoS class identifier (QCI).

Figure 3:
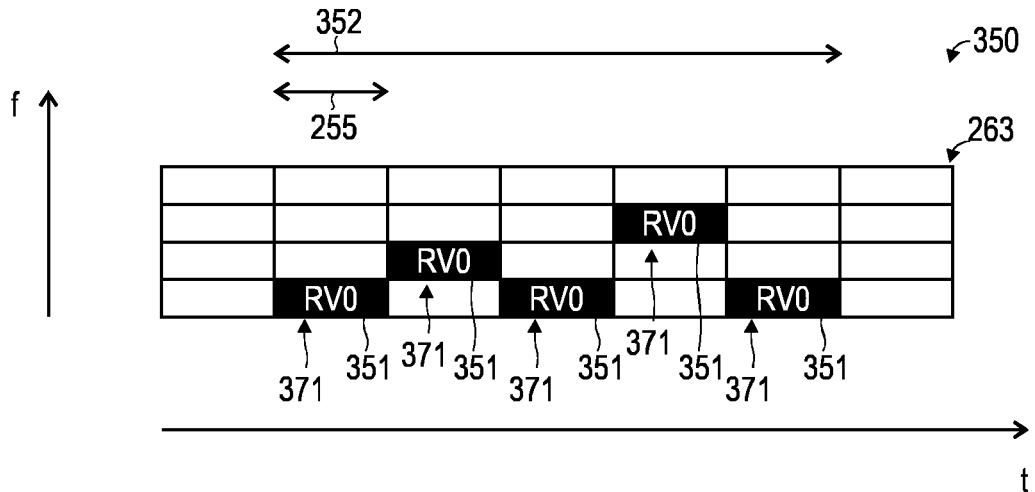
FIG. 3 schematically illustrates transmission of multiple repetitions of encoded data for CE according to various examples.

FIG. 3 illustrates aspects with respect to CE. In particular, FIG. 3 illustrates aspects with respect to a burst 350 including multiple repetitions 351 of data encoded according to a redundancy version 371. As can be seen from FIG. 3, the plurality of repetitions 351 are communicated in subsequent subframes 255 of the channel 263. The transmission burst 350 of the repetitions 351 has a certain duration 352.

While in the scenario of FIG. 3 the transmission burst 350 includes subsequent repetitions 350 of the encoded data in subsequent subframes 255, in other examples, it is also possible that subsequent repetitions are not arranged contiguously with respect to the subframes 255, i.e., there may be intermittent subframes not occupied by a repetition of the encoded data of the transmission burst (not shown in FIG. 3). In other examples it would be possible that subsequent repetitions 350 are arranged within a single subframe 255 (not shown in FIG. 3).

The specific time-frequency arrangement of the repetitions 351 is illustrated in the example of FIG. 3 is an example only. Other examples are possible.

While in the scenario of FIG. 3 encoded data is communicated on the payload channel 263, similar techniques may be readily applied to other kinds and type of data, e.g., control data.

Figure 4:
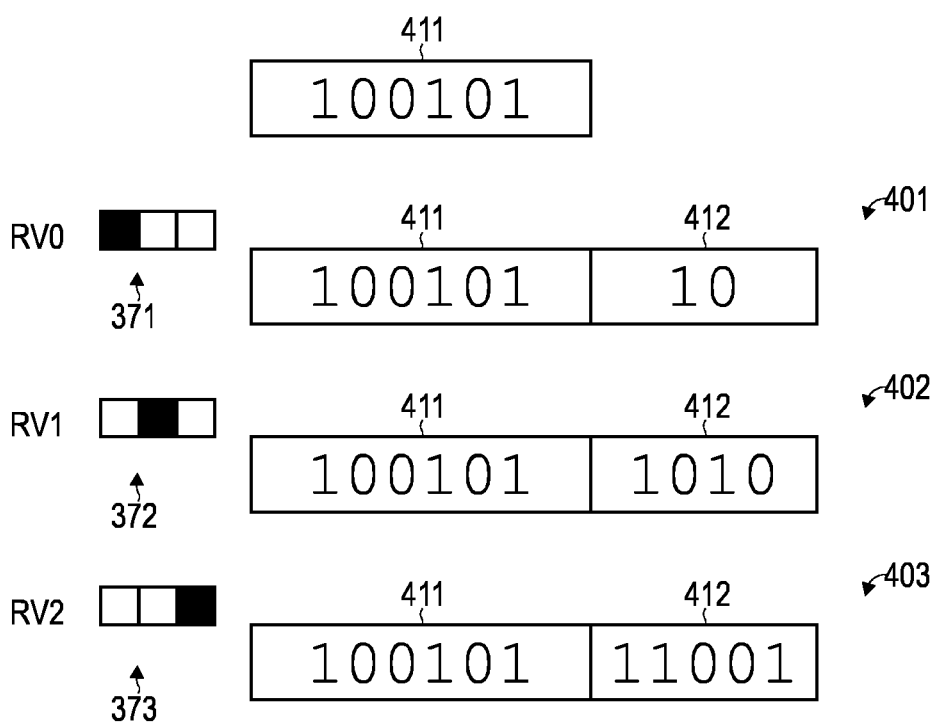
FIG. 4 schematically illustrates encoding of the data according to different redundancy versions and according to various examples.

FIG. 4 illustrates aspects of encoding data 401-403 according to different redundancy versions 371-373. As can be seen from FIG. 4, the raw data 411 includes a sequence of bits. For example, the data 411 can be a data packet, e.g., a MAC layer Service Data Unit (SDU). It would also be possible that the data 411 corresponds to a RRC command or other control data such as a ACK, NACK, UL grant, or DL assignment.

Encoding the data 411 can correspond to adding a checksum 412 to the data 411 to yield the encoded data 401-403.

Different techniques of encoding can be employed such as, e.g., Reed Solomon encoding, turbo convolutional encoding, convolutional coding, etc. Provisioning the checksum 412 can facilitate reconstruction of corrupted bits of the corresponding message 401-403 according to the coding scheme. Typically, the longer (shorter) the checksum 412, the more (less) robust the communication of the corresponding message 401-403 against noise and channel imperfections; thus, a probability for successful transmission of the data 411 can be tailored by the length of the checksum. Alternatively or additionally, encoding the data can correspond to applying interleaving where the bits of the data 411 are shuffled (not shown in FIG. 4).

Typically, different redundancy versions 371-373 correspond to checksums 412 of different length (as illustrated in FIG. 4). In other examples, it would also be possible that different redundancy version 371-373 employ checksums 412 of the same length, but encoded according to the different coding scheme. Alternatively or additionally, different redundancy versions may employ different interleaving schemes. Alternatively or additionally, different redundancy versions may employ different puncturing schemes.

Hereinafter, an example implementation of constructing different redundancy versions is given.

STEP 1 of constructing different redundancy versions: A block of information bits, i.e., the raw data 411 to be transmitted, is encoded. Here, additional redundancy bits are generated, i.e., in addition to the data 411. Let N denote the number of information bits; then—e.g., for E-UTRA RAT—the total number of the encoded bits (i.e., the sum of information bits and redundancy bits) may amount to 3N. A decoder that receives all 3N bits typically is able to decode the information bits, even if a large number of bit errors is present in the received bits due to a high BER.

STEP 2 of constructing different redundancy versions: Thus, in order to avoid excessive overhead of transmission, only a fraction of the redundancy bits is selected. The information bits and the selected redundancy bits form the first redundancy version 371. The amount of encoded bits according to the first redundancy version is 371 therefore, using the above example, somewhere between N and 3N. The process of removing redundancy bits by selecting the fraction is sometimes referred to as puncturing. This first redundancy version 371 may then be sent to the receiver.

STEP 3 of constructing different redundancy versions: In case a retransmission is required according to the HARQ protocol, a new redundancy version 372, 373 is sent. The higher order redundancy version 372, 373 includes additional redundancy bits from the ones that were previously punctured in step 2, and typically the same information bits again. In this way, after a couple of repetitions the whole 3N bits have been sent at least once.

According to examples, each transmission burst 350 includes a plurality of repetitions 351 of the encoded data 401-403 being encoded according to the same redundancy version 371-373.

Figure 5:
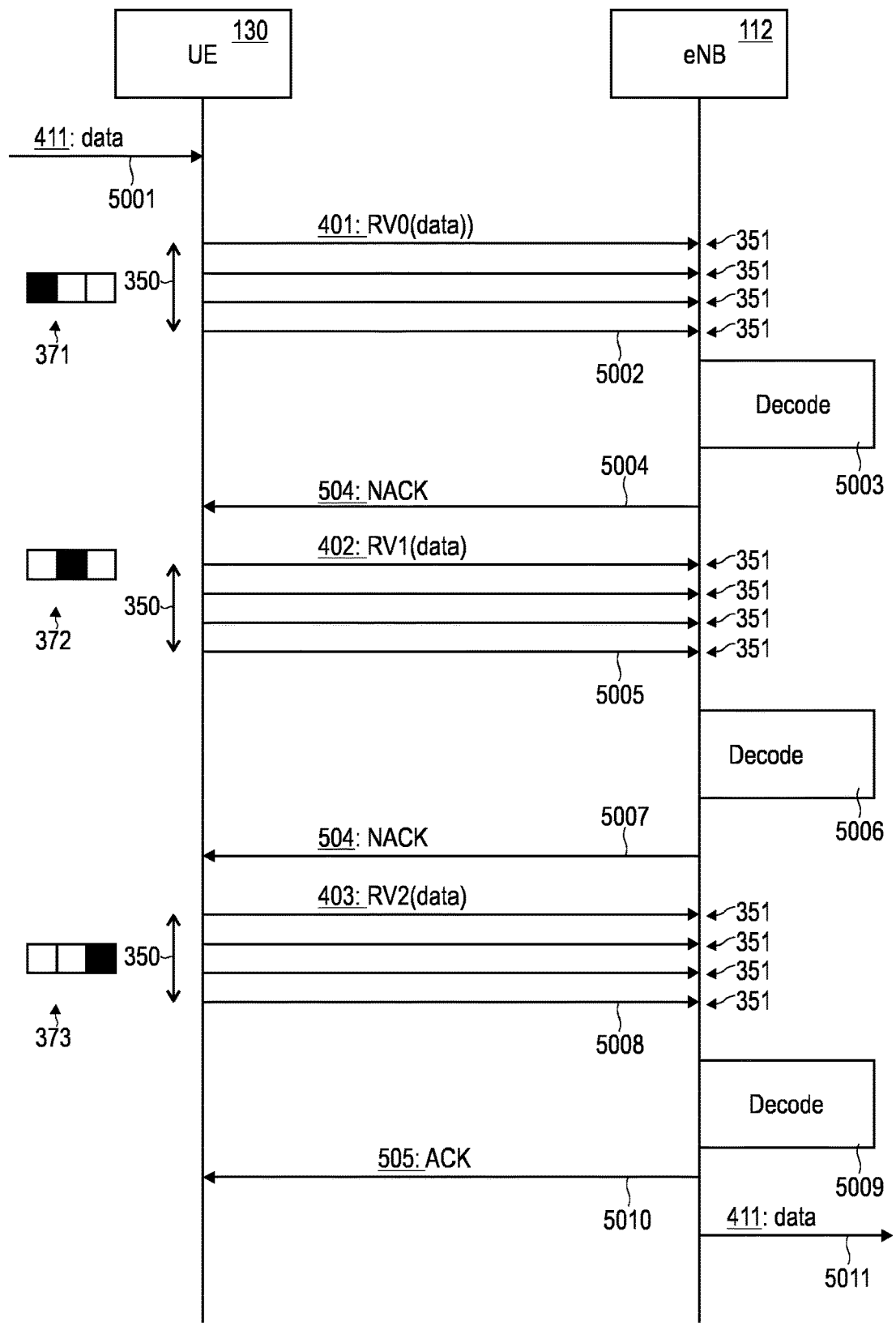
FIG. 5 is a signaling diagram of communicating multiple signals, different signals including multiple repetitions of encoded data according to different redundancy versions according to various examples.

FIG. 5 illustrates aspects of the HARQ protocol implemented by the MAC layer (generally, Layer 2) of the transmission protocol stack of the UE 130 and the BS 112, respectively. The HARQ protocol according to the example of FIG. 5 employs transmission bursts 350 including multiple repetitions 351 of encoded data 401-403. For example, FIG. 5 may relate to a scenario of transmission on an open spectrum shared between multiple networks. Central scheduling between the multiple networks may not be available such that collisions may occur. LBT and back-off procedures may be employed when transmitting.

At 5001, the raw data 411 is received, e.g., from a higher layer at the transmit buffer implemented by the UE 130. The data 411 is encoded to yield the encoded data 401-403.

Then, a signal 5002 including multiple repetitions 351 of the data 401 are transmitted by the UE 130 to the BS 112. This defines a transmission burst 350 according to CE. All repetitions 351 of the data 401 are encoded according to the redundancy version 371.

Generally, when operating with CE in an open spectrum, there may be different aspects limiting the amount of repetitions 351 of the encoded data 401. For example, the UE 130 may operate in half duplex and may therefore require a so-called measurement gap during which the UE switches from transmission mode to reception mode in order to listen for the synchronization channel to maintain its timing synchronization with the network. Furthermore, when operating in an open spectrum, there will also be typically a maximum channel occupancy time restriction which limits the time that a single node may use the resources on the open spectrum after a successful LBT. The UE 130 may use a CE level defining a number of repetitions of the encoded data 401 that can fit into the maximum channel occupancy time for the open spectrum. The number of repetitions 351 expected at 2001 can, therefore, be defined with respect to a CE level. Typically, a count of repetitions 351 is in the range of 50-2500.

Once communication of the signal 5012 including the multiple repetitions 351 of the data 411 encoded according to the redundancy version 371 has ended, i.e., at the end of the transmission burst 350, the BS 112 attempts to decode the encoded data 401, 5003. Decoding at 5003 is based on a combination of the multiple repetitions 351 of the data 401 encoded according to the redundancy version 371. This helps to increase the probability of successfully decoding the data 411. In the example of FIG. 5, decoding fails at 5003 and, consequently, the BS 112 sends a negative acknowledgement message 504 to the UE 130 at 5004.

The UE 130 receives the negative acknowledgement message 504 and transmits a signal 5005 including multiple repetitions 351 of the data 402 now encoded according to the redundancy version 372 in the respective transmission burst 350.

Then, at 5006, decoding—which is based on a combination of the multiple repetitions 351 of the signal 5005—again fails and the BS 112, at 5007, transmits another negative acknowledgement message 504.

The negative acknowledgement message 504 is received by the UE 130 which, in response to reception of the negative acknowledgement message 504, transmits a signal 5008 including multiple repetitions 351 of the data 403 encoded according to the redundancy version 373.

Then, at 5009, decoding—which is based on the combination of the multiple repetitions 351 of the data 403 included in the signal 5008—is successful and, consequently, the BS 112 transmits a positive acknowledgement message 505 at 5010 to the UE 130. Then, the decoded data 411 can be passed to higher layers at 5011, e.g., from a receive buffer of the BS 112.

FIG. 5 is an example of communication of the data 411 in UL direction. Similar techniques may be readily applied for communication and DL direction.

Figure 6:
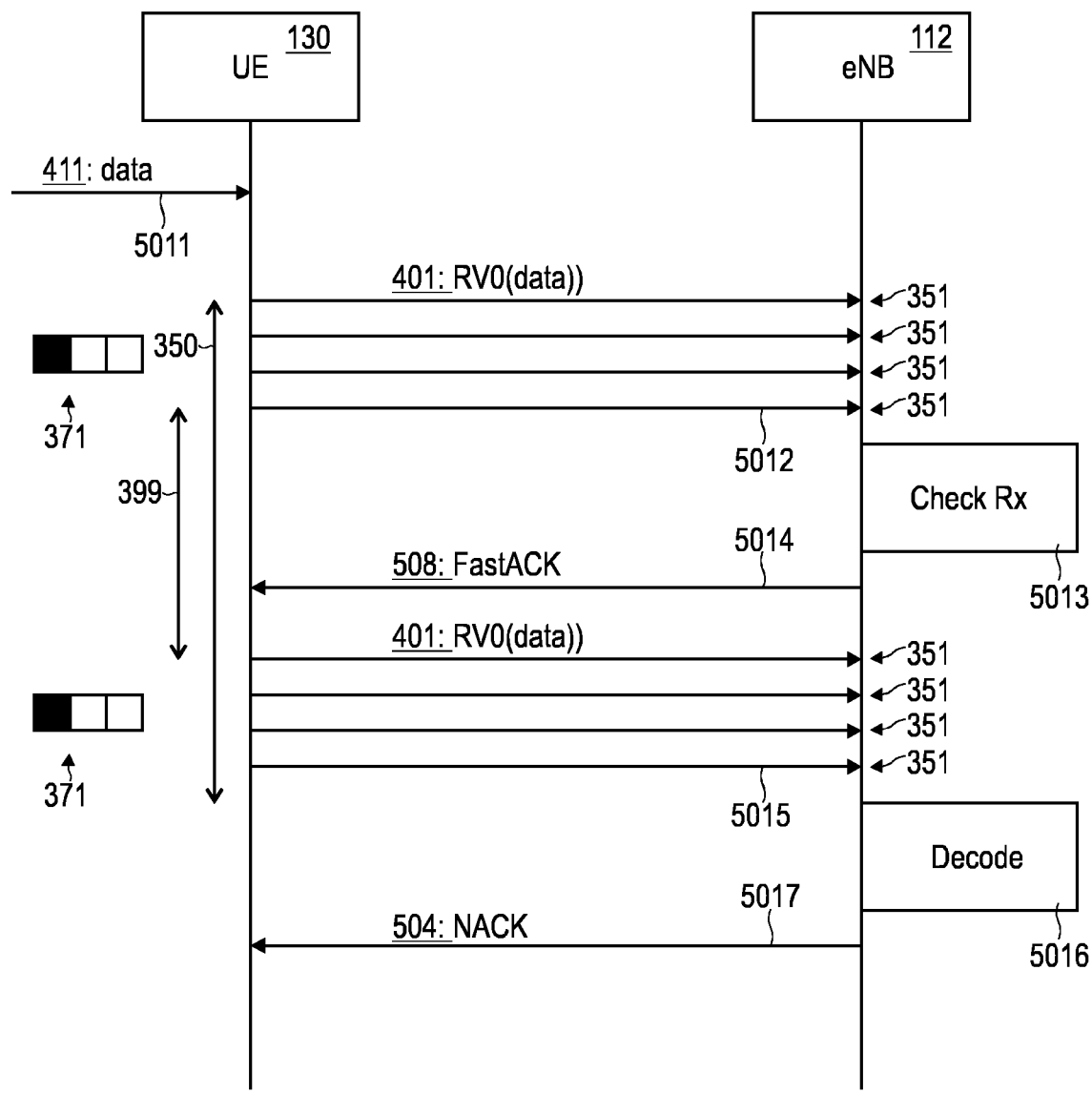
FIG. 6 is a signaling diagram illustrating communicating signals, each signal including multiple repetitions of data according to a given redundancy version according to various examples.

FIG. 6 illustrates aspects of transmission of a FastACK 508 during a transmission burst 350 including multiple repetitions 351 of data 411 encoded according to the same redundancy version, i.e., in the example of FIG. 6, the redundancy version 371. For example, FIG. 6 may relate to a scenario of transmission on an open spectrum shared between multiple networks. Central scheduling between the multiple networks may not be available such that collisions may occur. LBT and back-off procedures may be employed when transmitting.

A 5011 corresponds to 5001 (cf. FIG. 5).

Then, a signal 5012 including multiple repetitions 351 of the data 401 encoded according to the redundancy version 371 is transmitted. This corresponds to a part of the retransmission burst 350. However, in the scenario of FIG. 6, the retransmission burst 350 is not completed upon completion of transmission of the signal 5012.

In response to receiving a signal 5012, the BS 112 transmits a FastACK 508 to the UE 130, 5014. After transmitting the FastACK 508, the BS 112 then receives, from the UE 130, a second signal 5015 including a second plurality of repetitions 351 of the data 401 encoded according to the redundancy version 371. Both signals 5012 and 5015 include the data 401 encoded according to the redundancy version 371; thus, both signals 5012, 5015 contribute to the burst 350.

For example, the time gap 399 between transmission of the signal 5012 and transmission of the signal 5015 may be less than ten subframes 255, optionally less than four subframes 255, further optionally less than three subframes 255. A short time gap 399 facilitates low latencies for transmission of the data 411. The short time gap 399 may be enabled by the low-layer implementation of the FastACK 508 which may be, e.g., native to the physical Layer 1.

Then, at 5016, the BS 112 attempts to decode the data 401 encoded according to the redundancy version 371 based on a combination of the repetitions 351 of the data 411 transmitted at 5012 and the repetitions 351 of the data 411 transmitted at 5015. In the example of FIG. 6, decoding at 5016 fails and, therefore, the BS 112—in response to decoding at 5016—transmits a negative acknowledgement message 504, 5017. Generally, the acknowledgement message 504 may be indicative of a decoding result of the decoding. The acknowledgement message 504 may be a negative or positive ACK of the HARQ. Thus, the acknowledgement message 504 may be native to Layer 2 or Layer 3 of the transmission protocol stack.

The FastACK 508 may be indicative of the likelihood of successfully decoding at 5016. Because the FastACK 508 is transmitted prior to executing said decoding at 5016, the FastACK 508 may be indicative of a prospective likelihood of successfully decoding at 5016. In particular, as is apparent from FIG. 6, decoding of the repetitions 351 of the data 401 encoded according to the redundancy version 371 does not commence prior to transmitting the FastACK 508.

Various examples are conceivable to determine the likelihood of successfully decoding at 5016. In the example of FIG. 6, a reception check is implemented at 5013. The reception check at 5013 serves as a trigger criterion for transmitting the FastACK 508 at 5014. In the various examples described herein, different trigger criteria for transmitting the FastACK 508 are conceivable.

For example, it would be possible to perform, at 5013, a symbol comparison between at least one repetition of at least one reference symbol included in the signal 5012. The at least one reference symbol may be predefined and a-priori known to the UE 130 and the BS 112: the comparison can be with respect to at least one predefined symbol. Then, depending on the symbol comparison, it is possible to selectively transmit the acknowledgement signal 508.

For example, if the symbol comparison yields a low correlation between the at least one reference symbol included in the signal 5012 and the at least one predefined symbol, it can be concluded that collision with a further node attempting to access the wireless link 101 is likely to have occurred during 5012. Then, it is possible to not transmit the FastACK 508, thereby implicitly indicating to the UE 130 that collision is likely to have occurred and that, therefore, the likelihood of successfully decoding at 5016 is reduced. The UE may then implement a back-off. Alternatively it would also be possible to transmit the FastACK 508 at 5014, the FastACK 508 including an indicator indicative of the collision. This helps to explicitly indicate the collision.

A further example of a trigger criterion for transmitting the FastACK 508 that could be checked at 5013—alternatively or additionally to further trigger criteria such as the above-identified symbol comparison—includes a threshold comparison between a value indicative of a receive signal level of the signal 5012 and a predefined threshold. For example, a power spectral density (PSD) could be considered. Alternatively or additionally, a maximum amplitude could be considered.

Then, it is possible that the FastACK 508 may be selectively transmitted depending on the threshold comparison. For example, if the value indicative of the received signal level exceeds the predefined threshold, it may be concluded that collision is likely to have occurred during 5012 with a further node accessing the wireless link 101. Then, it may be possible to not transmit the FastACK 508 at 5014, thereby implicitly indicating to the UE 130 that collision might have occurred. Alternatively or additionally, it would also be possible to implement the FastACK 508 including an indicator indicative of the collision that has likely occurred during 5012. This helps to explicitly indicate the collision.

Figure 7:
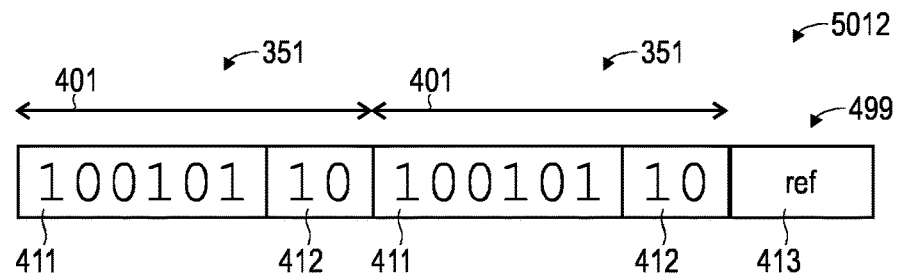
FIG. 7 schematically illustrates a signal including multiple repetitions of encoded data and further including at least one repetition of at least one reference symbol according to various examples.

FIG. 7 illustrates aspects with respect to the signal transmitted at 5012. The signal 5012 includes the data 411 and a checksum 412, i.e., the encoded data 401. In particular, the signal 5012 includes multiple repetitions 351 of the encoded data 401 (while in the example of FIG. 7 a count of two repetitions 351 is illustrated, generally, a larger count of repetitions 351 is possible; for example, the signal 512 may include at least 10 repetitions of the encoded data 401, optionally at least 100 repetitions 401, further optionally at least 1000 repetitions 1000). The signal 5012 also includes at least one reference symbol 413. In the example of FIG. 7, the signal 5012 includes a single repetition 499 of the at least one reference symbol 413; however, in other examples, the signal 5012 may include multiple repetitions 499 of the at least one reference symbol 413.

In particular, in the example of FIG. 7, the single repetition 499 of the at least one reference symbol 413 is arranged adjacent to the repetitions 351 of the encoded data 401 within the signal 5012. This ensures that the reception characteristics of the at least one reference symbol 413 are indicative of the reception characteristics of the encoded data 401.

Figure 8:
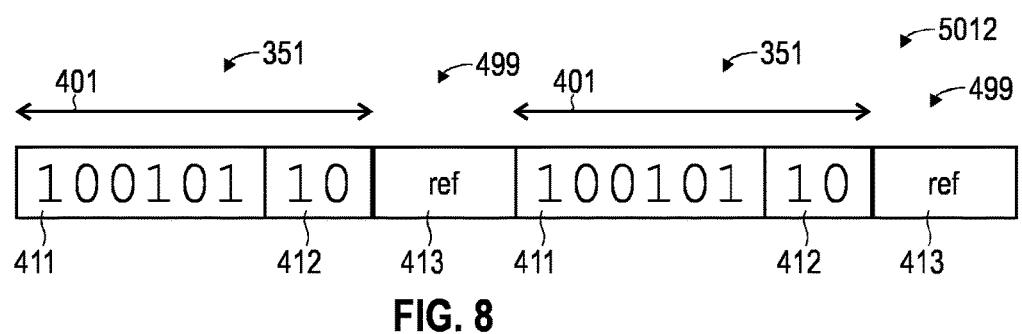
FIG. 8 schematically illustrates a signal including multiple repetitions of encoded data and further including at least one repetition of at least one reference symbol according to various examples.

FIG. 8 illustrates aspects with respect to the signal 5012. The example of FIG. 8 generally corresponds to the example of FIG. 7. However, in the example of FIG. 8, the signal 5012 includes multiple repetitions 499 of the at least one reference symbol 413. Furthermore, in the example of FIG. 8, the plurality of repetitions 499 of the at least one reference symbol 413 are arranged interleaved with the plurality of repetitions 351 of the encoded data 401 within the signal 5012. In the example of FIG. 8, a repetition 499 of the at least one reference symbol 413 is arranged in-between two neighboring repetitions 351 of the encoded data 401.

Figure 9:
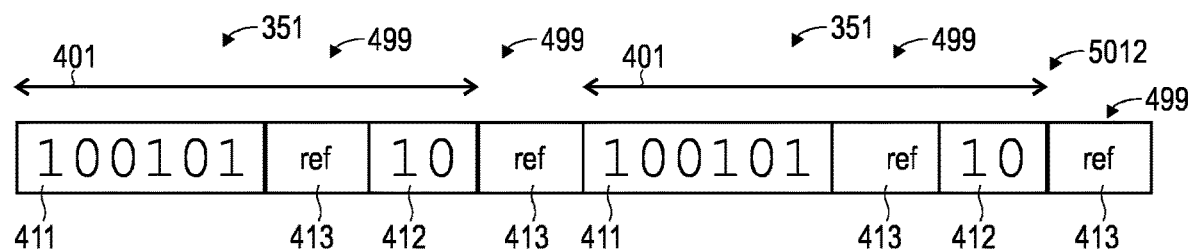
FIG. 9 schematically illustrates a signal including multiple repetitions of encoded data and further including at least one repetition of at least one reference symbol according to various examples.

FIG. 9 illustrates aspects with respect to the signal 5012. The example of FIG. 9 generally corresponds to the example of FIG. 8. Also in the example of FIG. 9, the signal 5012 includes multiple repetitions 499 of the at least one reference symbol 413. Furthermore, also in the example of FIG. 9, the multiple repetitions 499 of the at least one reference symbol 413 are arranged interleaved with the repetitions 351 of the encoded data 401 within the signal 5012. In the example of FIG. 9, an additional repetition 499 of the at least one reference symbol 413 is arranged in between the data 411 and the checksum 412 of each repetition 351 of the encoded data 401.

Generally, there may be more repetitions 499 of the at least one reference symbol 413 than repetitions 351 of the encoded data 401-403 (cf. FIG. 9). In other examples, however, there may be fewer repetitions 499 of the at least one reference symbol 413 than repetitions 351 of the encoded data 401-403 (cf. FIG. 7). Hence, the count of repetitions 499 may be smaller than the count of repetitions 351. This may facilitate low overhead. Furthermore, it may not be required to decode the reference symbols 413 so that typically a smaller count of repetitions 499 is sufficient to determine the likelihood of successfully decoding the data 401 at significant accuracy.

While in the example of FIG. 7-9 scenarios have been discussed with respect to the signal 5012, similar concepts may be readily applied with respect to the signal 5015 including additional repetitions 351 of the encoded data 401.

Next, details with respect to the at least one reference symbol 413 are disclosed. In various examples, it is possible that the at least one reference symbol 413 includes a single symbol. In other examples, it would be possible that the at least one reference symbol 413 includes a sequence of reference symbols, e.g., including a count of not less than 10 reference symbols, optionally of not less than 50 reference symbols, further optionally of not less than 500 reference symbols. By employing a sequence of reference symbols 413, a higher reliability can be achieved when performing a symbol comparison, e.g., at 5013 (cf. FIG. 6).

Next, details with respect to the FastACK 508 are disclosed. In the various examples described herein, it is possible to implement the FastACK 508 by one or more acknowledgement reference symbol. In particular, it would be possible to employ a sequence of acknowledgement reference symbols. The one or more acknowledgement reference symbols may have a predefined waveform and/or amplitude. In a manner which is comparable to the symbol comparison that has been described above with respect to the check at 5013, it is then possible that the receiver of the FastACK 508 performs a symbol comparison between the one or more acknowledgement reference symbols and predefined acknowledgement symbols. By transmitting such a FastACK 508 which is defined with respect to one or more acknowledgement reference symbols, i.e., which is native to the physical layer/Layer 1 according to the OSI model and does not encode control data, it becomes possible to transmit and analyze the FastACK 508 with low latency. In particular, it may be avoided that higher layers—e.g., Layer 2 or Layer 3 are involved when creating and/or analyzing the FastACK 508. In particular, if compared to acknowledgement messages defined with respect to the HARQ protocol, such a lower-layer implementation of the FastACK 508 facilitates low latency in transmission. In some examples, the FastACK 508 may include one or more repetitions of a pilot signal. In such a scenario, the well-defined amplitude of the pilot signal can be reused to implement channel sounding of the wireless link 101.

For example, the one or more acknowledgement reference symbols may be repeated a certain number of times. This helps to implement the symbol comparison at greater accuracy.

Figure 10:
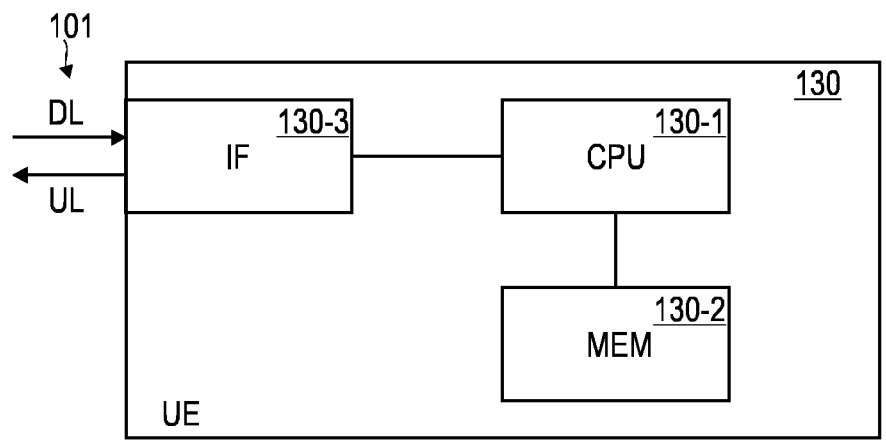
FIG. 10 schematically illustrates a UE according to various examples.

FIG. 10 schematically illustrates the UE 130. The UE 130 includes control circuitry implemented by a processor 130-1, e.g., a single core or multicore processor. Distributed processing may be employed. The processor 130-1 is coupled to a memory 130-2, e.g., a non-volatile memory. The memory 130-2 may store program code that is executable by the processor 130-1. Executing the program code may cause the processor 130-1 to perform techniques as disclosed herein, e.g., relating to: CE; transmitting and/or receiving a FastACK; communicating on an open spectrum; etc. Such functionality which is illustrated with respect to the processor 130-1 in the example of FIG. 10, in other examples may also be implemented using hardware. The UE 130 also includes an interface 130-3 configured to communicate with the BS 112 on the wireless link 101. The interface 130-3 may include an analog front end and/or a digital front end. The interface 130-3 may implement a transmission protocol stack, e.g., according to the 3GPP LTE technology. The transmission protocol stack may include a physical layer (Layer 1), a MAC layer (Layer 2), etc.

Figure 11:
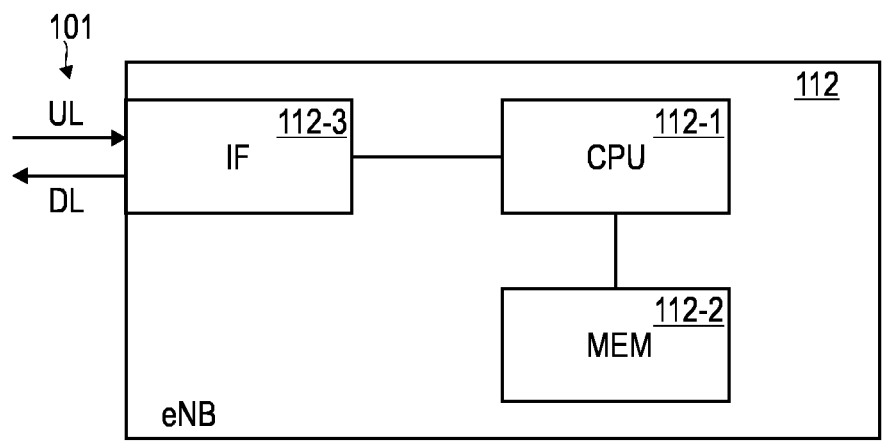
FIG. 11 schematically illustrates a base station according to various examples.

FIG. 11 schematically illustrates the BS 112. The BS 112 includes control circuitry implemented by a processor 112-1, e.g., a single core or multicore processor. Distributed processing may be employed. The processor 112-1 is coupled to a memory 112-2, e.g., a non-volatile memory. The memory 112-2 may store program code that is executable by the processor 112-1. Executing the program code can cause the processor 112-1 to perform techniques as disclosed herein, e.g., relating to: CE; transmitting and/or receiving a FastACK; and transmitting and/or receiving on an open spectrum. Such techniques as illustrated with respect to FIG. 11 for the processor 112-1 and the memory 112-2 may also be implemented partly or fully in hardware in other examples. The BS 112 also includes an interface 112-3 configured to communicate with the UE 130 on the wireless link 101. The interface 112-3 may include an analog front end and/or a digital front end. The interface 112-3 may implement a transmission protocol stack, e.g., according to the 3GPP LTE technology. The transmission protocol stack may include a physical layer (Layer 1), a MAC layer (Layer 2), etc.

Figure 12:
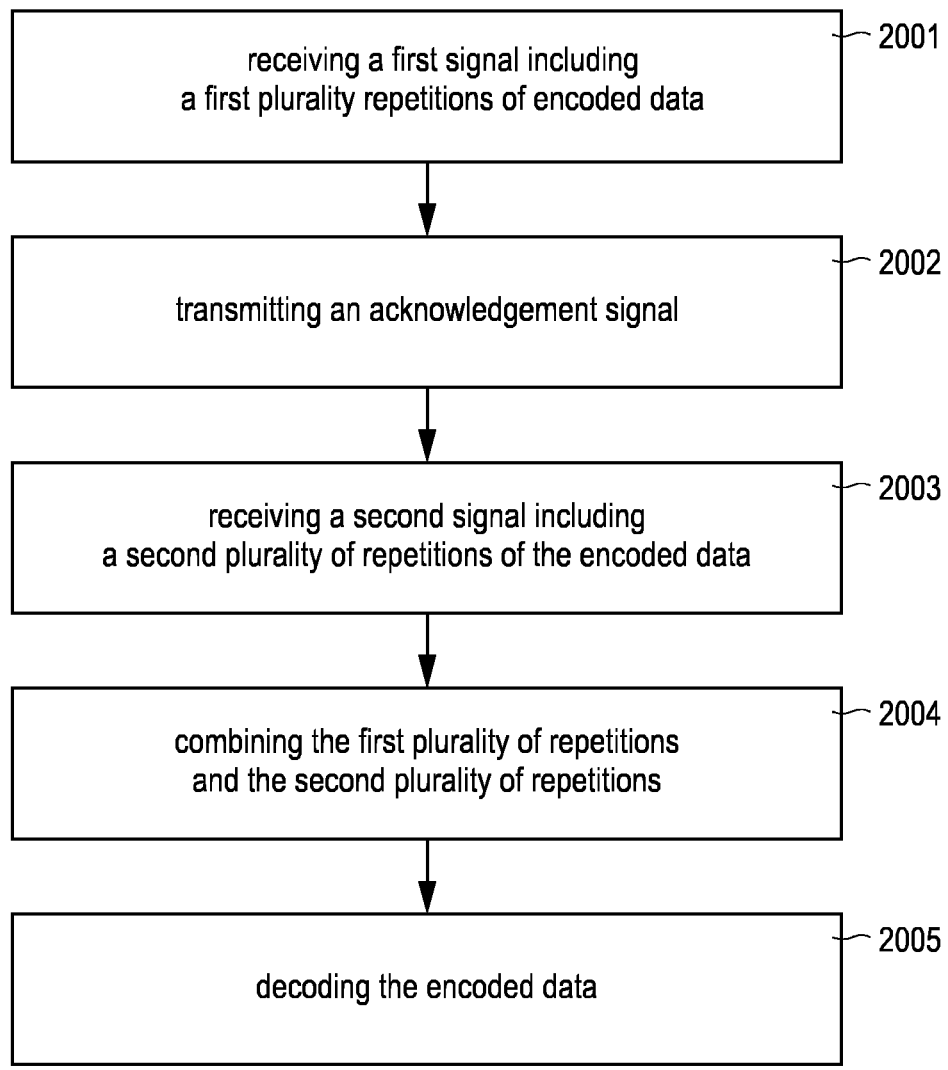
FIG. 12 is a flowchart of a method according to various examples.

FIG. 12 is a flowchart of a method according to various examples. For example, the method according to FIG. 12 may be executed by the processor 112-1 of the BS 112 and/or the processor 130-1 of the UE 130.

First, in 2001, a first signal is received. The first signal includes a first plurality of repetitions of encoded data. All repetitions may include the data encoded according to the same redundancy version.

The first signal may be received from a BS or a UE. For example, the first signal may be received on an open spectrum. The first signal may be received in UL, DL, or D2D.

The multiple repetitions included in the signal received at 2001 may correspond to CE.

Next, in 2002, an acknowledgement signal—the FastACK—is transmitted. The reason for transmitting the acknowledgement signal 2002 is to reduce the risk of the node transmitting the encoded data to waste a significant amount of the channel time and energy for transmission without the receiver of the encoded data being aware of the transmission and/or with a significantly reduced likelihood of successfully decoding the encoded data, e.g., due to collision on the open spectrum.

It is possible that the FastACK is transmitted in block 2002 for any transmission of an ongoing data connection, possibly with the exception of the very first initialization message of a random access procedure.

After transmitting the FastACK at 2002, a second signal is received. The second signal includes a second plurality of repetitions of the encoded data. The data received in 2003 may be encoded according to the same redundancy version as the data received in 2001. Hence, the first and second signals of 2001, 2003 may be part of the same transmission burst of CE.

Next, in 2004, the first plurality of repetitions of the encoded data received in 2001 and the second plurality of repetitions received in 2004 are combined to yield a combined signal. This may be a combination of the signals in the digital baseband before decoding in the digital domain, such as the performing of channel decoding of the signals. This may be denoted a I-Q modulated combined signal. Then, the decoding and 2005 is based on the combined signal.

Generally, the data may be UL data or DL data. In other words, it is possible that CE is applied for, both, UL and DL.

Figure 13:
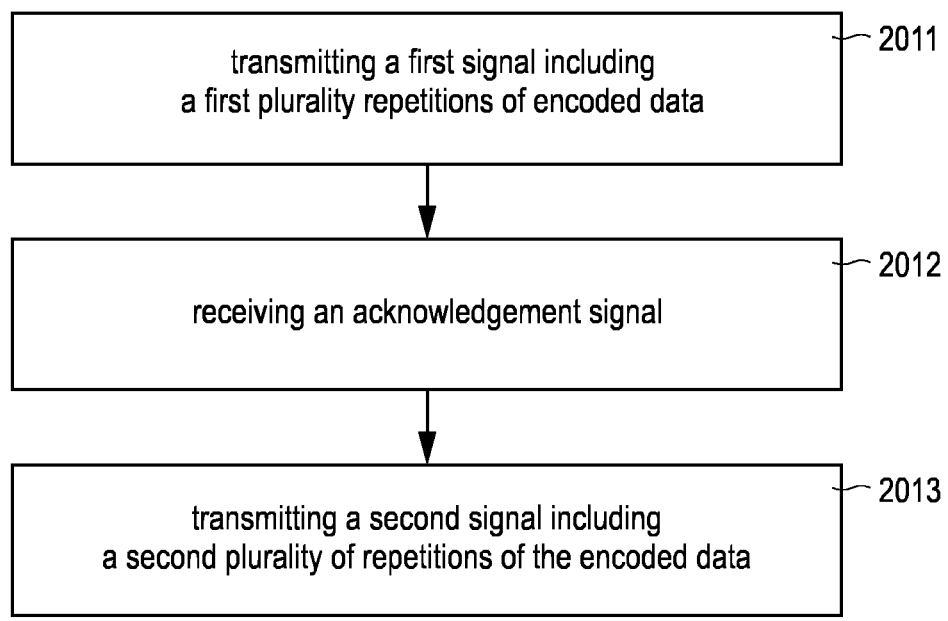
FIG. 13 is a flowchart of a method according to various examples.

FIG. 13 is a flowchart of a method according to various examples. For example, the method according to FIG. 13 may be executed by the processor 112-1 of the BS 112 and/or the processor 130-1 of the UE 130.

First, in 2001, a first signal is transmitted. The first signal includes a first plurality of repetitions of encoded data. 2011 is inter-related with 2001.

Next, in 2012, an acknowledgement signal is received, i.e., the FastACK. 2012 is inter-related with 2002.

Next, in 2013, a second signal is transmitted. The second signal includes a second plurality of repetitions of the encoded data. 2013 is inter-related with 2003.

Figure 14:
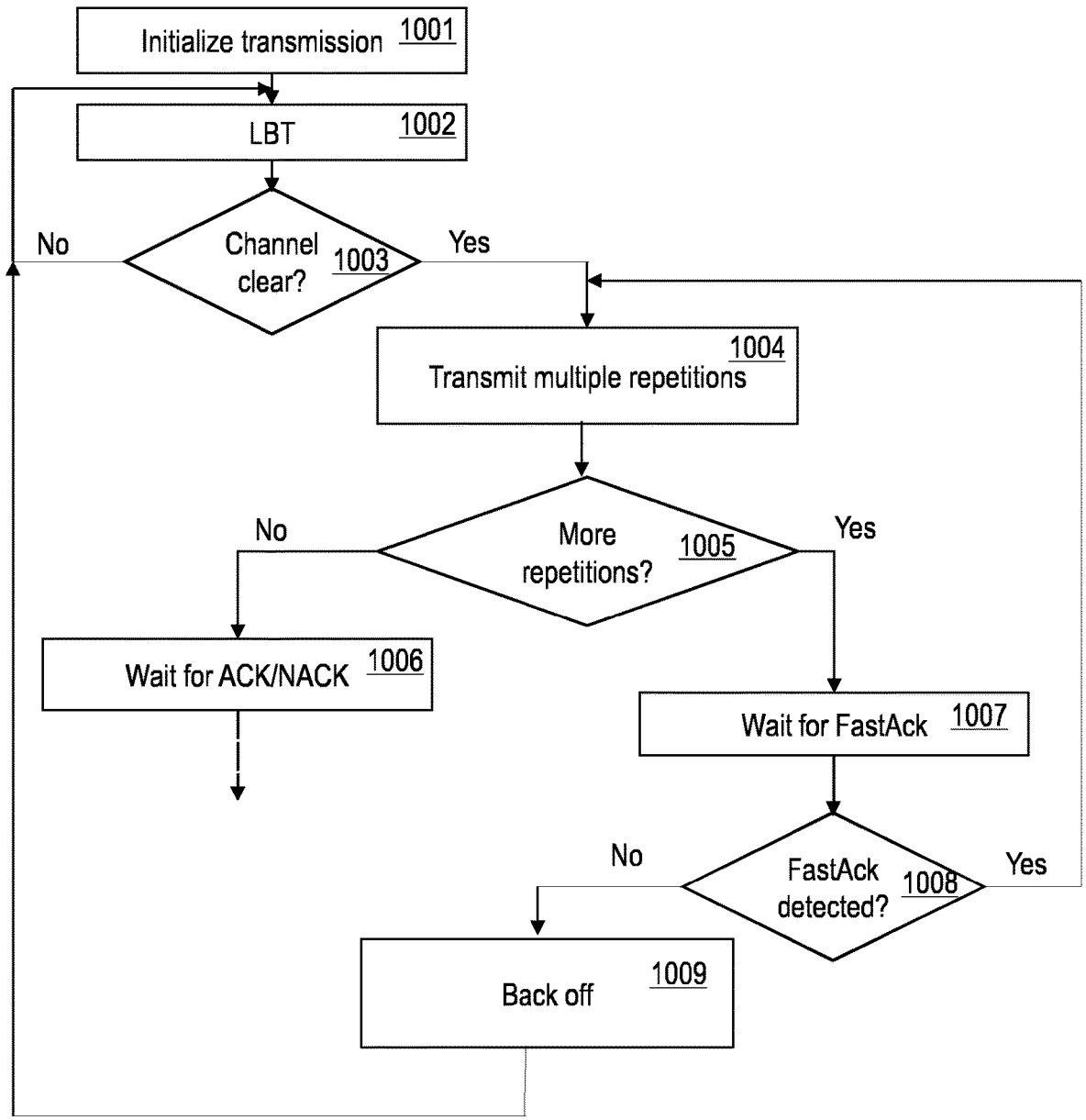
FIG. 14 is a flowchart of a method according to various examples.

FIG. 14 is a flowchart of a method according to various examples. First, in 2001, transmission of data is initialized. This may be because the data arrives in a transmission buffer, e.g., of the UE or the BS.

Next, in 1002, a LBT channel sensing is performed. Based on the LBT channel sensing, in 2003 it is judged whether resources are available on the respective channel on the wireless link 101. If this is not the case, the LBT is repeated after a certain back-off time. Otherwise, the method commences with 1004.

In 1004, multiple repetitions of encoded data are transmitted. The number of repetitions may be defined by a CE level. All repetitions include the data encoded according to the same redundancy version.

In 1005 it is checked whether further repetitions of the encoded data are required. If further repetitions of the encoded data are not required, the method commences with 1006. At 1006, waiting for a positive Layer 2 or Layer 3 acknowledgement message or a negative Layer 2 or Layer 3 acknowledgement message of a HARQ protocol is implemented (further details of HARQ re-transmissions are not illustrated in FIG. 14).

If, at 1005, it is judged that further repetitions of the encoded data are required according to the CE level, the method commences with 1007. At 1007, waiting for a FastACK is implemented. The FastACK may correspond to one or more repetitions of a reference symbol sequence or even a single reference symbol. In other words, the FastACK may correspond to a Layer 1 control message.

The trigger criterion for transmission of the FastACK may be reception of a sequence of reference symbols transmitted along with the multiple repetitions of the encoded data in 1004. Such a sequence of reference symbols can be identified reliably. For example, the effective signal-to-noise ratio required to reliably detecting such a sequence of reference symbols may be lower than the signal-to-noise ratio required for successfully decoding a data transmission. Thus, generally, the number of repetitions of the at least one reference symbol can be smaller than the number of repetitions of the encoded data.

In 1008 it is checked whether the FastACK has been detected, Here, it is again possible to implement a symbol comparison. Such a symbol comparison between one or more acknowledgement reference symbols and corresponding one or more predefined acknowledgement symbols can be performed with higher reliability even for comparably low signal-to-noise ratio.

If, in 1008 it is judged that the FastACK has been detected, the method commences with re-executing 1004. Hence, multiple repetitions of the encoded data are re-transmitted. If, at 1008 it is judged that the FastACK has not been detected, the method commences with 1009. Here, a back-off is implemented and then a LBT and 1002 is re-commenced.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, while various examples have been described for cellular networks, similar techniques may be readily implemented for other kinds of networks, e.g., point-to-point networks.

The invention claimed is:

1. A method, comprising:
   during a single transmission burst:
   receiving a first signal from a remote node, the first signal comprising a first plurality of repetitions of encoded data, the first plurality of repetitions of the encoded data being encoded according to a first redundancy version:
   in response to said receiving of the first signal, transmitting an acknowledgement (ACK) signal to the remote node; node
   receiving a second signal from the remote node, the second signal comprising a second plurality of repetitions of the encoded data, the second plurality of repetitions of the encoded data being encoded according to the first redundancy version: and
   combining the first plurality of repetitions of the encoded data and the second plurality of repetitions of the encoded data to yield a combined signal; and
   decoding the encoded data based on the combined signal.

2. The method of claim 1, further comprising:
   performing a symbol comparison between at least one repetition of at least one reference symbol received as part of the first signal with at least one predefined symbol,
   wherein the acknowledgement ACK signal is transmitted based on the symbol comparison.

3. The method of claim 2, wherein the at least one repetition of the at least one reference symbol is arranged adjacent to or interleaved with the first plurality of repetitions of the encoded data within the first signal.

4. The method of claim 2, wherein the count of repetitions of the at least one reference symbol is smaller than the count of the first plurality of repetitions of the encoded data.

5. The method of claim 1, further comprising:
   performing a threshold comparison between a value indicative of a receive signal level of the first signal and a predefined threshold,
   wherein the acknowledgement signal is transmitted based on the threshold comparison.

6. The method of claim 1, further comprising:
   decoding the first plurality of repetitions of the encoded data after transmitting the acknowledgement signal.

7. The method of claim 1, wherein the acknowledgement signal comprises at least one repetition of at least one acknowledgement reference symbol.

8. The method of claim 1, wherein the acknowledgement signal is native to the physical Layer 1 of a transmission protocol stack and/or comprises one or more reference symbols.

9. The method of claim 1, further comprising:
   in response to said decoding of the data: transmitting an acknowledgement message to the remote node, the acknowledgement message being indicative of a decoding result of said decoding.

10. The method of claim 1, wherein the first signal and the second signal are received on an open spectrum shared between multiple networks.

11. The method according to claim 1, wherein the receiving the first and second signals from the remote node comprises:
    receiving the first and second signals from the remote node during a single Hybrid Acknowledgement Repeat Request (HARQ) transmission burst.

12. A method, comprising:
    in a single transmission burst:
    transmitting a first signal to a remote node, the first signal comprising a first plurality of repetitions of encoded data, the first plurality of repetitions of the encoded data being encoded according to a first redundancy version:
    receiving an acknowledgement signal from the remote node; and
    in response to said receiving of the acknowledgement signal, transmitting a second signal to the remote node, the second signal comprising a second plurality of repetitions of the encoded data, the second plurality of repetitions of the encoded data being encoded according to the first redundancy version.

13. The method of claim 12,
    wherein the transmitting the first signal comprises transmitting at least one repetition of at least one reference signal.

14. The method of claim 13, wherein the at least one repetition of the at least one reference symbol is arranged adjacent to or interleaved with the first plurality of repetitions of the encoded data within the first signal.

15. The method of claim 12, wherein the acknowledgement signal comprises at least one repetition of a pilot signal.

16. The method of claim 12, further comprising:
    after transmitting the second signal, receiving an acknowledgement message, the acknowledgement message being indicative of a decoding result of said decoding.

17. The method of claim 12, wherein the first signal and the second signal are received on an open spectrum shared between multiple networks.

18. A network node comprising control circuitry configured to perform:
    during a single transmission burst:
    receiving a first signal from a remote node, the first signal comprising a first plurality of repetitions of encoded data, the first plurality of repetitions of the encoded data being encoded according to a first redundancy version;
    in response to said receiving of the first signal, transmitting an acknowledgement (ACK) signal to the remote node; and
    receiving a second signal from the remote node, the second signal comprising a second plurality of repetitions of the encoded data, the second plurality of repetitions of the encoded data beinq encoded according to the first redundancy version:
    combining the first plurality of repetitions of the encoded data and the second plurality of repetitions of the encoded data to yield a combined signal; and decoding the encoded data based on the combined signal.

19. The network node of claim 18, in combination with:
a second network node comprising control circuitry configured to perform:
- transmitting, to the network node, the first signal comprising the first plurality of repetitions of encoded data;
- receiving the acknowledgement signal from the network node; and
- in response to said receiving of the acknowledgement signal, transmitting, to the network node, the second signal comprising the second plurality of repetitions of the encoded data.

20. A network node comprising control circuitry configured to perform:
in a single transmission burst:
- transmitting a first signal to a remote node, the first signal comprising a first plurality of repetitions of encoded data, the first plurality of repetitions of the encoded data being encoded according to a first redundancy version;
- receiving an acknowledgement signal from the remote node; and
- in response to said receiving of the acknowledgement signal, transmitting a second signal to the remote node, the second signal comprising a second plurality of repetitions of the encoded data, the second plurality of repetitions of the encoded data being encoded according to the first redundancy version.

* * * * *